United States Patent [19]

Zamek

[11] 4,251,423

[45] Feb. 17, 1981

[54] POLYESTER WIRE ENAMELS

[75] Inventor: Otto S. Zamek, Schenectady, N.Y.

[73] Assignee: General Electric Company, Schenectady, N.Y.

[21] Appl. No.: 12,200

[22] Filed: Feb. 14, 1979

[51] Int. Cl.$^3$ ............................ C08K 5/06; H01B 7/00
[52] U.S. Cl. ......................... 260/33.2 R; 260/33.4 R; 174/110 SR
[58] Field of Search ....................... 260/33.2 R, 33.4 R

[56] References Cited

U.S. PATENT DOCUMENTS

| | | | |
|---|---|---|---|
| 2,936,296 | 5/1960 | Precopio et al. | 260/33.4 |
| 3,141,859 | 7/1964 | Sheffer et al. | 260/33.4 |
| 3,338,743 | 8/1967 | Laganis | 260/33.2 R |
| 3,342,780 | 9/1967 | Meyer et al. | 260/33.4 UR |
| 4,088,619 | 5/1978 | Holzrichter | 260/33.4 R |
| 4,127,553 | 11/1978 | Osada et al. | 260/33.4 R |
| 4,140,729 | 2/1979 | Tobias et al. | 260/33.4 R |

*Primary Examiner*—Joseph L. Schofer
*Assistant Examiner*—Peter F. Kulkosky
*Attorney, Agent, or Firm*—Morgan, Finnegan, Pine, Foley & Lee

[57] ABSTRACT

Superior wire enamels comprise a polyester of a dibasic organic acid, a polyhydric alcohol having at least 3 hydroxyl groups, and 1,2-propylene glycol in a polar oxygenated solvent comprising a monoether or monoester of an alkylene or polyalkylene glycol. Electrical conductors coated with such enamels are also disclosed.

8 Claims, No Drawings

POLYESTER WIRE ENAMELS

This invention relates to polyester wire enamels and to electrical conductors coated therewith. More particularly, it is concerned with polyesters of 1,2-propylene glycol in solution in hydroxyl rich polar oxygenated solvents.

BACKGROUND OF THE INVENTION

Polyester wire enamels composed of aromatic diacids, polyhydric alcohols and glycols are known from the disclosures in Precopio and Fox, U.S. Pat. No. 2,936,296; Meyer and Zalewski, U.S. Pat. No. 3,342,780; and Sheffer and Jordan, U.S. Pat. No. 3,141,859. These materials when prepared with or without the aid of cresylic acid solvents form unstable solutions in cresylic acids or in glycol ether type solvents, with crystalline poly(ethylene terephthalate) coming out of solution. Such enamels have a very short shelf life and, by virtue of their instability, preclude the preparation of commercially efficient high solids content wire coating solutions. U.S. Pat. No. 3,141,859 proposes to solve the problem by using expensive and toxic monochlorophenol to replace only part of the cresylic acid, which itself is corrosive, toxic and causes pollution problems. The above-mentioned patents are incorporated herein by reference.

It has now been found that polyester wire enamels can be prepared with or without the aid of a reaction solvent if 1,2-propylene glycol is used as the main glycol. Enamels can be made up from such polyesters with glycol ether or ester solvents, such as the methyl, ethyl or n-butyl ethers of ethylene or diethylene glycol to a high solids count ($\geq 50\%$) with no solution instability due to crystallization, even after standing for long times.

Moreover, this invention eliminates the need for cresylic acid type solvents and provides excellent continuous coatings for conductors, without any toxic effluents. For example polyester enamels based on 1,2-propylene glycol having glycol ethers or esters either bound into the resin during preparation, or added later by simple dilution produce smooth, flexible, continuous, and abrasion resistant coatings on electrical conductors, which are resistant to cut through, heat shock and electrical breakdown.

DESCRIPTION OF THE INVENTION

According to the present invention, there are provided electrical wire enamels comprising
 (a) a polyester of
  (i) terephthalic acid, isophthalic acid a reactive derivative thereof, or a mixture thereof;
  (ii) a polyhydric alcohol having at least three hydroxyl groups; and
  (iii) 1,2-propylene glycol; and
 (b) a polar oxygenated solvent having at least one active hydroxyl group and comprising predominantly
  (i) an alkylene glycol monoether or monoester,
  (ii) a polyalkylene glycol monoether or monoesters, or
  (iii) a mixture of (i) and (ii).

Among the preferred features of the present invention are electrical wire enamels as defined above wherein a carboxyl group of the polyester molecule can be esterified with an active hydroxyl group of the solvent. These form when the polyester is prepared in the presence of the solvent and the ratios of ingredients are selected to give the desired result.

Also among the preferred features of the present invention are electrical wire enamels as defined above which also include an alkyl titanate.

Also contemplated by the present invention are electrical conductors provided with a continuous coating of the new wire enamels and cured at elevated temperatures.

With respect to components (a)(i)–(a)(iii), inclusive, these are conventional and well known to those skilled in this art by reason of the teachings, for example, in the above-mentioned patents.

By way of illustration, the component (a)(i) will comprise terephthalic acid, isophthalic acid a di (lower) alkyl ester ($C_1$-$C_6$), e.g., dimethyl terephthalate, or other reactive derivative, e.g., acyl halide, etc. A minor amount of component (a) can be replaced with another dicarboxylic acid or derivative, e.g., benzophenone dicarboxylic acid, naphthalene dicarboxylic acid, adipic acid, or their corresponding esters, and the like. Preferably, component (a)(i) will comprise a mixture of terephthalic acid and isophthalic acid.

As a second polyester forming ingredient (a)(ii) there can be employed a polyhydric alcohol having at least three hydroxyl groups, such as glycerine, pentaerythritol, 1,1,1-trimethylolpropane, sorbitol, mannitol, dipentaerythritol, tris(2-hydroxyethyl) isocyanurate (THEIC), and the like. Preferably, as component (a)(ii), there will be used glycerine.

Component (a)(iii) will comprise predominantly 1,2-propylene glycol, although minor amounts of other alkylene glycols can be used in admixture therewith, such as ethylene glycol, 1,4-butanediol, 1,5-pentanediol, 1,6-cyclohexane, dimethanol, neopentyl glycol, and the like. Preferably, component (a)(iii) will comprise substantially completely 1,2-propylene glycol.

The polar oxygenated solvent having at least one active hydroxyl group will be selected from (i) an alkylene glycol monoether or monoester, such as ethylene glycol monomethyl ether, ethylene glycol monoethyl ether, ethylene glycol mono-n-butyl ether, ethylene glycol monohexyl ether, ethylene glycol monophenyl ether, ethylene glycol monoacetate, ethylene glycol monohexanoate, propylene glycol monomethyl ether, propylene glycol monoacetate, 1,4-butylene glycol mono-n-butyl ether, 1,6-hexylene glycol monomethyl ether, and the like, preferably, ethylene glycol monomethyl ether or ethylene glycol mono-n-butyl ether, and from (ii) a polyalkylene glycol monoether or monoester, such as diethylene glycol monoethyl ether, diethylene glycol mono-n-butyl ether, diethylene glycol monoacetate, diethylene glycol monophenyl ether, dipropylene glycol monomethyl ether, dipropylene glycol mono-n-butylene, triethylene glycol monomethyl ether, triethylene glycol monoacetate, and the like.

Suitable alkyl titanates include tetraisopropyl titanate, tetramethyl titanate, tetrabutyl titanate, tetrahexyl titanate, bis(acetoacetyl)diisopropyl titanate, and the like. Tetraisopropyl titanate is preferred.

In making the polyester, there should preferably be an excess of alcohol groups over carboxyl groups, so that the hydroxyl rich polar ether or ester component can form a linkage with the polyester, although this is not essential. In any event, the preferred ratio of ingredients are entirely conventional, see the patents cited above, and the especially preferred ratios of ingredients will be exemplified in detail hereinafter. The manner of making the polyester is likewise conventional. The ingredients can be reacted sequentially or all together, at elevated temperature. Preferably, the ingredients are all added to a suitable reactor and heated to 200°–250° C. until no more water distills off. This may take several hours. Then the mixture is cooled somewhat, e.g., to 150° to 190° C., and additional glycol ether or ester is added, preferably with a minor proportion of a hydrocarbon diluent, e.g., an aromatic naphtha, such as Solvesso 100, or toluene, dodecane, and the like.

The wire enamels thus made are applied to an electrical conductor, e.g., copper, silver or stainless steel wire, in conventional fashion. Thus, wire speeds of 15 to 65 ft./min. or greater can be used with wire tower temperatures of 250° to 800° F. The build up of coating on the wire can be increased by repetitive passes through the enamel. As will be seen, the coatings produced from the present enamels have excellent smoothness, flex resistance, continuity, solvent resistance, heat aging, dissipation factors, cut through resistance, heat shock, abrasion resistance and dielectric strength.

DESCRIPTION OF THE PREFERRED EMBODIMENTS

The following examples illustrate the present invention. They are not intended to limit the scope of the claims in any manner whatsoever.

EXAMPLE 1

A wire enamel is made by charging a suitable sized flask with the following reactants

|  | GMS |
| --- | --- |
| 1,2-Propylene glycol | 461.37 |
| Glycerin | 211.18 |
| Terephthalic acid | 805.57 |
| Isophthalic acid | 345.24 |
| Tetraisopropyltitanate | 2.16 |
| Diethylene glycol monobutyl ether | 280.00 |

The contents are heated slowly with the evolution of water to a maximum temperature of 225° C. until no more is given off. The contents are allowed to cool to 180° C. at which time 157 gms. of diethylene glycol monobutyl ether, 422 gms. of diethylene glycol monomethyl ether, and 392 gms. of Solvesso 100 are added. The resultant crystal clear solution is filtered. Final solids are 51.95% with a viscosity of 1000 cps at 25° C. To a 1375 gms. sample is added 17.18 gms. of tetraisopropyltitanate and 22.60 gms. of a 60% solution of Mondur SH in diethylene glycol monomethyl ether.

This enamel is run at 50 ft./min. on a wire tower at 580°–905° F. using seven passes on 18 AWG copper wire. The following properties are obtained:

| Flex-25% | 1 |
| --- | --- |
| Continuity (BKS/200') | 0 |
| Heat Age (100 hrs.-175° C.) | 3X |
| Diss. Factor 170° C. | 10.4 |
| Cut Thru ° C. 2000 gm | 200 |
| Heat Shock 0%-30 min.-150° C. | 3X |
| Diel. KV | 9.6 |
| Burnout OFM | 5.27 |
| Repeat Scrape | 11.2 |

EXAMPLE 2

A flask is charged with the following:

|  | GMS |
| --- | --- |
| 1,2-Propylene glycol | 461.37 |
| Glycerin | 211.18 |
| Terephthalic acid | 805.57 |
| Isophthalic acid | 345.24 |
| Tetraisopropyltitanate | 2.16 |

The contents are heated slowly with the evolution of water to a maximum temperature of 225° C. until no more water is given off. The contents are allowed to cool to 180° C. at which time 870 gms. of diethylene glycol monomethyl ether, 290 gms. of ethylene glycol monomethyl ether, and 290 g. of Solvesso 100 are added. The resultant clear solution is filtered. Final solids are 50.50% with a viscosity of 900 cps. at 25° C. To a 1400 g. sample is added 18 gms. of tetraisopropyltitanate and 21.98 gms. of 60% Mondur SH in diethylene glycol monomethyl ether.

This enamel is run at 40 ft./min. on a wire tower at 580°–905° F. using seven passes on 18 AWG copper wire. The following properties are obtained:

| Smoothness | Excellent |
| --- | --- |
| Flex 25% | 1 |
| Continuity (BKS/200') | 0 |
| Diss. Factor 170° C. | 4.0 |
| Cut Thru °C. 2000 gm. | 248 |
| Heat Shock 0%-30 min.-200° C. | 3X |
| Diel. KV | 10.5 |
| Burnout OFM | 5.28 |
| Repeat Scrape | 19.2 |

The glycol ether(s) in Example 1 are chemically bonded through hydroxyl groups to free carboxyl groups in the polyesters because they are present in the ester-forming reaction.

It is obviously possible to make many variations in the present invention in light of the above, detailed description. For example, the alkyl titanate can be omitted. The polyisocyanate, Mondur SH, can be varied in amount, e.g., from 1 to 25% based on the resin, or it can be omitted altogether. There can also be included from 1 to 5% based on the total solids of a phenol-formaldehyde or melamine-formaldehyde resin. Metal driers can also be added, e.g., 0.2 to 1.0% based on total solids, of zinc octoate, and the like. Instead of the monoether alcohols, the following can be used: diethylene glycol monoacetate and diethylene glycol mono-n-butyl ether. All such obvious variations are within the full intended scope of the appended claims.

I claim:
1. An electrical wire enamel comprising
(a) a polyester of
   (i) terephthalic acid, isophthalic acid a reactive derivative thereof, or a mixture thereof;
   (ii) a polyhydric alcohol having at least three hydroxyl groups; and
   (iii) 1,2-propylene glycol; and
(b) a polar oxygenated solvent having at least one active hydroxyl group and comprising predominantly
   (i) an alkylene glycol monoether or monoester,
   (ii) a polyalkylene glycol monoether or monoester, or
   (iii) a mixture of (i) and (ii).

2. An electrical wire enamel as defined in claim 1 wherein a functional group of the polyester molecule is reacted with an active hydroxyl group of said solvent.

3. An electrical wire enamel as defined in claim 1 which also includes an alkyl titanate.

4. An electrical wire enamel comprising
   (a) a polyester of
   (i) terephthalic acid in combination with isophthalic acid or a reactive derivative thereof;
   (ii) glycerine; and
   (iii) propylene 1,2-glycol; and
   (b) a solvent therefor comprising predominantly diethylene glycol mono-n-butyl ether, diethylene glycol monoethyl ether, or a mixture thereof.

5. An electrical wire enamel as defined in claim 4 wherein a carboxyl group of the polyester molecule is esterified with an active hydroxyl group of said solvent.

6. An electrical wire enamel as defined in claim 5 which also includes tetraisopropyl titanate.

7. An electrical conductor provided with a continuous coating of the polyester wire enamel of claim 1.

8. An electrical conductor provided with a continuous coating of the polyester wire enamel of claim 4.

* * * * *